(12) United States Patent
Piock

(10) Patent No.: US 6,578,547 B2
(45) Date of Patent: Jun. 17, 2003

(54) SPARK-IGNITION INTERNAL COMBUSTION ENGINE WITH DIRECT INJECTION

(75) Inventor: Walter Piock, Hitzendorf (AT)

(73) Assignee: AVL List GmbH, Graz (AT)

( * ) Notice: Subject to any disclaimer, the term of this patent is extended or adjusted under 35 U.S.C. 154(b) by 42 days.

(21) Appl. No.: 09/933,661

(22) Filed: Aug. 22, 2001

(65) Prior Publication Data

US 2002/0043241 A1 Apr. 18, 2002

(30) Foreign Application Priority Data

Aug. 24, 2000 (AT) .............................. 619/00 U

(51) Int. Cl.[7] .................................................. F02B 5/00
(52) U.S. Cl. ...................... 123/305; 123/657; 123/193.6
(58) Field of Search .............................. 123/305, 193.6, 123/657, 659, 276

(56) References Cited

U.S. PATENT DOCUMENTS 4,920,937 A * 5/1990 Sasaki et al. ............... 123/305
6,158,410 A * 12/2000 Piock et al. ................. 123/301
6,325,040 B1 * 12/2001 Tanaka ........................ 123/294

FOREIGN PATENT DOCUMENTS

GB 2276206 9/1994

* cited by examiner

Primary Examiner—Tony M. Argenbright
Assistant Examiner—Katrina B. Harris
(74) Attorney, Agent, or Firm—Dykema Gossett PLLC

(57) ABSTRACT

A spark-ignition internal combustion engine with direct injection into the combustion chamber which operates according to the jet-guided combustion method, and includes at least one injection device and one ignition device per cylinder. In order to increase the stratification capabilities and the service life of the injection device, the ignition device is disposed centrally, preferably in the zone of the of the cylinder axis, and the injection device is disposed laterally offset in the direct vicinity of the ignition location, with the distance between the orifice of the injection device and the ignition location being 0.1 to 0.24 times the piston diameter.

12 Claims, 2 Drawing Sheets

SPARK-IGNITION INTERNAL COMBUSTION ENGINE WITH DIRECT INJECTION

BACKGROUND OF THE INVENTION

The invention relates to a spark-ignition internal combustion engine with direct injection into the combustion chamber which operates according to the jet-guided combustion method, with at least one injection device and one ignition device per cylinder.

DESCRIPTION OF THE PRIOR ART

In spark-ignition engines with direct injection one distinguishes between wall-guided and jet-guided combustion methods. In wall-guided combustion methods the injection jet is directed more or less directly against the wall of the combustion chamber. This offers an increased preparation time for the mixture formation. As a result of the relatively large freedoms in the arrangement of the injection device, which is mostly close to the cylinder wall, the gas-reversing valves can be designed optimally with respect to position and arrangement. Since injection jet and ignition device are disposed relatively far apart from one another, there is no direct wetting of the spark plug. The system is very insensitive to changes in the shape of the injection jet. The disadvantage is, however, that wall-guided combustion methods have a limited stratification capability. A purposeful wetting of the piston wall is obtained in wall-guided combustion methods. As a result of the longer transport path for the mixture, the basic flow and the fluctuations have a stronger effect on the mixture stratification and thus on combustion.

In jet-guided combustion methods on the other hand, the injection jet is not directed towards the combustion chamber wall or the piston top, but a substantial atomization of the injection jet in the zone of the ignition device is desired. Jet-guided combustion methods have the advantage over wall-guided combustion methods that it is possible to realize an extreme stratification capability which has a direct beneficial influence on fuel consumption. Moreover, a high stability of the stratification can be achieved. The central arrangement of the injection device and the spark plug lead to a reduced size of the gas-reversing valves. A further disadvantage is that a wetting of the ignition device occurs frequently. This can have an unfavorable influence on the combustion stability. The combustion method further shows a high sensitivity with respect to the quality and the shape of the injection jet.

In known jet-guided combustion methods the injection device is usually disposed centrally in the zone of the cylinder axis. The spark plug on the other hand is positioned laterally offset thereto in the combustion chamber ceiling, depending on the constructional conditions. The arrangement of the orifice of the injection device in the zone of the cylinder axis leads to the disadvantage, however, that only very low flow speeds arise in this zone, which leads to the consequence that fuel residues at the orifice are not blown away. This can lead to a coking of the orifice of the injection device, as a result of which the same have a relative short life.

GB 2 276 206 A shows an internal combustion engine with an injection device disposed centrally in the zone of the cylinder axis which is disposed close to a spark plug positioned outside of the center. The injection of the fuel is not performed directly into the combustion chamber, but into an injector chamber of the injection device which is separated from the combustion chamber by a poppet valve.

SUMMARY OF THE INVENTION

It is the object of the present invention to increase the stratification capability and the service life of the injection device in a direct-injection spark-ignition internal combustion engine with a jet-guided combustion method.

This occurs in accordance with the invention in such a way that the ignition device is disposed centrally, preferably in the zone of the of the cylinder axis, and the injection device is disposed laterally offset in the direct vicinity of the ignition location, with the distance between the orifice of the injection device and the ignition location being 0.1 to 0.24 times the piston diameter.

As a result of the decentralized arrangement of the injection device, the orifice of the injection device is disposed in a zone of higher flow speeds, as a result of which fuel residues can be blown away effectively. As a result of the ultimate vicinity to the ignition device, it is possible to realize extreme charge stratifications with exceptionally favorable igniting capabilities and, as a result, a particularly low fuel consumption.

It is preferably provided in this respect that the angle of inclination of the jet axis of the injection device to the cylinder head sealing plane is approx. between 40° and 80° and that the angle between the jet axis of the injection device and the axis of the ignition device is approx. between 10° and 65°, with the axis of the ignition device preferably being disposed parallel to the cylinder axis. A high stratification stability can be achieved by this constructional arrangement. At the same time, the wetting of the spark plug is reduced to a minimum.

In order to form extreme stratifications with high stability it is particularly advantageous to provide in the piston a flat, rounded and substantially circular trough. It is preferably provided that the center of the piston trough, when seen in a plan view, is displaced with respect to the cylinder axis in the direction of the jet axis, with the displacement being particularly preferably between 0.02 to 0.08 times the piston diameter. The piston depth best suited for a lean combustion is obtained between approx. 0.04 to 0.1 times the piston diameter. The mean piston trough diameter should be approximately between 0.35 to 0.5 times the piston diameter.

In order to achieve a particularly high lean-making capability it is advantageous when the combustion chamber ceiling formed by the cylinder head and/or the piston top are shaped in such a way that during the compression stroke of the piston a purposeful flow, preferably a cylindrical flow, is initiated from the injection device to the ignition device at the upper dead center. As a result of the purposeful flow to the ignition device, additional air is guided to the ignition location, thus leading to the prevention of coking of the ignition device. The purposeful flow to the ignition device is promoted when the piston top is provided with a squeezing surface on the side of the injection device.

BRIEF DESCRIPTION OF THE DRAWINGS

The invention is now outlined in closer detail by reference to the enclosed drawings. They show schematically.

DETAILED DESCRIPTION OF THE PREFERRED EMBODIMENTS

Figure 1:
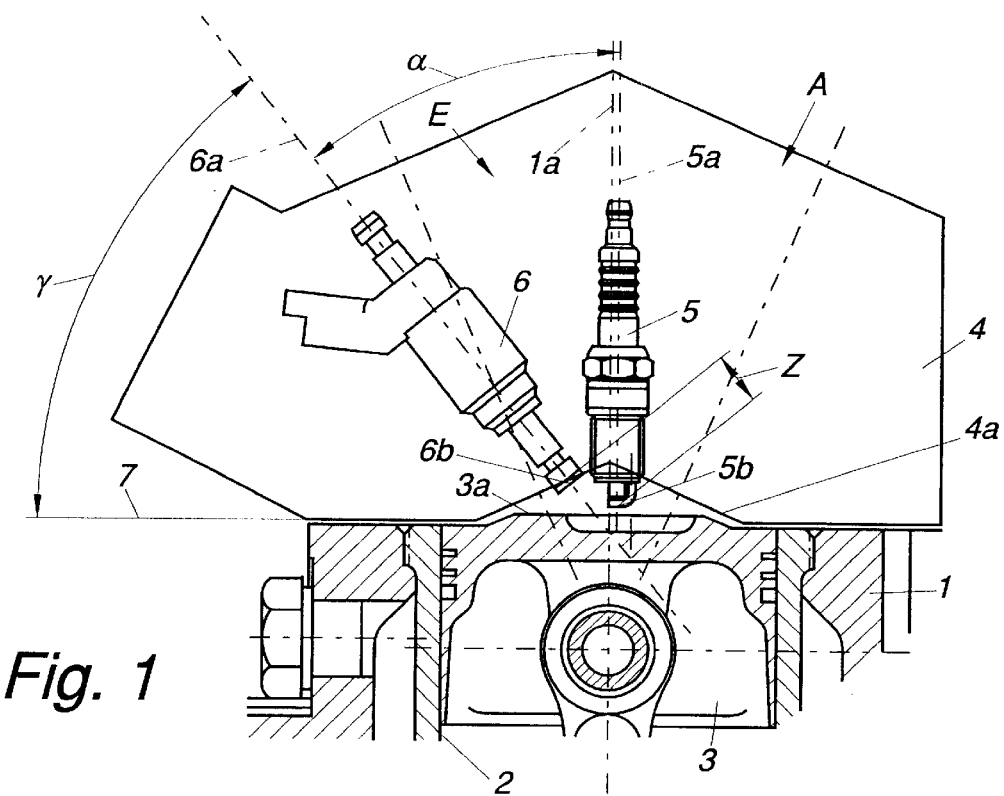
FIG. 1. shows a sectional view in a transversal plane of an engine with the cylinder axis the in an internal combustion engine in accordance with the invention.

The internal combustion engine comprises a cylinder housing 1 with at least one piston 3 reciprocating in a cylinder 2. The cylinder axis is designated with reference numeral 1a. An ignition device 5 and an injection device 6 are disposed in a cylinder head 4 which is fastened to a cylinder housing 1. An angle α of approx. 10° to 65° is provided between the axis 5a of the ignition device 5 and the jet axis 6a of the injection device 6. The jet axis 6a of the injection device 6 encloses with the cylinder head sealing plane 7 an angle γ of approx. 40° to 80°. The injection device 6 is disposed on the inlet side E in the cylinder head 4. The outlet side is designated by A.

Figure 3:
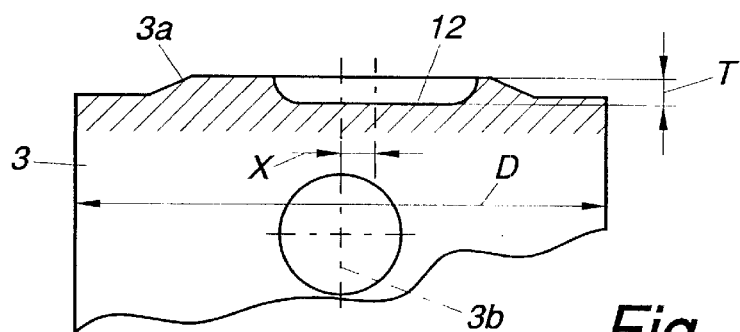
FIG. 3 shows a piston of the internal combustion engine in a sectional view.

As is shown in FIG. 1, with distance Z between the orifice 6b of the injection device 6 and the ignition location 5b is approx. 0.1 to 0.24 times the piston diameter D (see FIG. 3).

Figure 2:
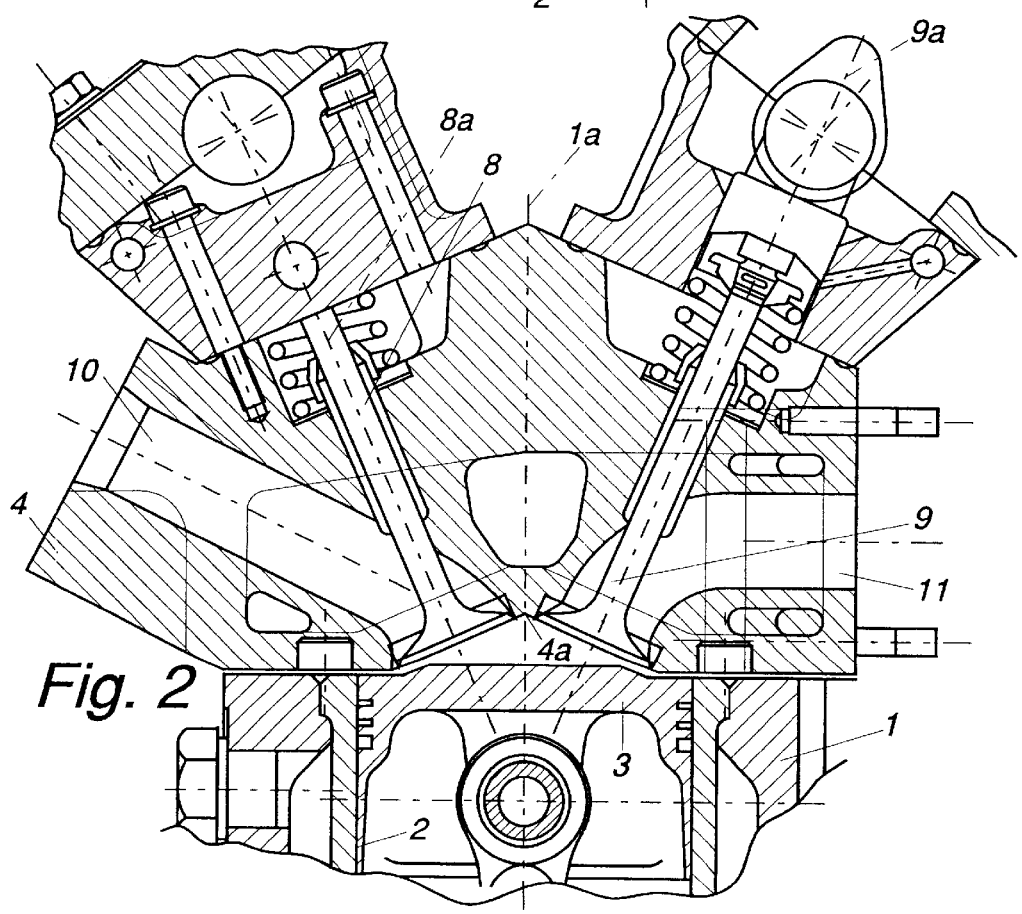
FIG. 2 shows the internal combustion engine in a valve axial plane.

FIG. 2 shows a sectional view through the cylinder head 4 in a valve axis plane formed by the valve axes 8a and 9a of the intake valve 8 and the exhaust valve 9. Reference numeral 10 designates an intake manifold, and reference numeral 11 an exhaust manifold.

Figure 4:
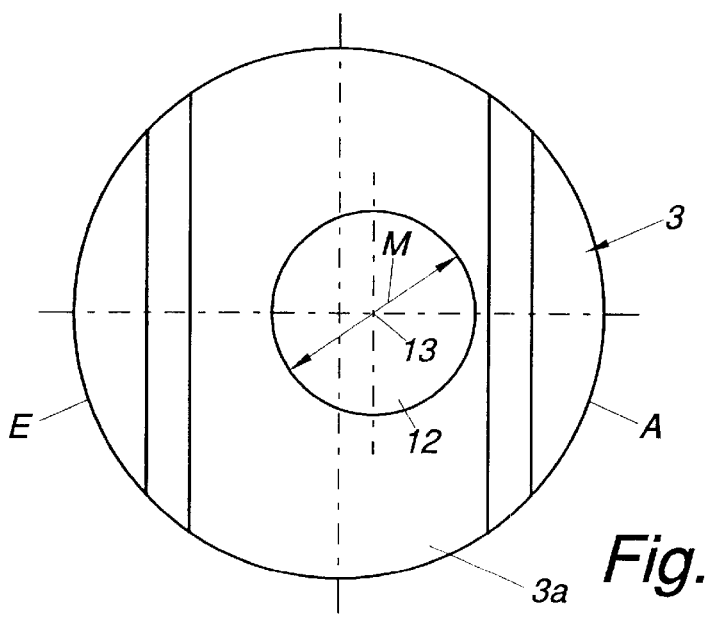
FIG. 4 shows said piston in a plan view.

FIGS. 3 and 4 schematically show the shape of the surface of piston 3. The piston top 3a of the piston 3 is provided with a flat rounded piston trough 12 having a substantially circular shape. The piston depth T is approx. between 0.04 and 0.1 times the piston diameter D. The mean trough diameter M is approx. between 0.35 and 0.5 times the mean piston diameter D. The piston trough 12 is, as seen in the plan view in FIG. 4, slightly displaced in the direction of the jet axis 6a with respect to the cylinder axis 1a, with the displacement X, i.e., the distance between the piston trough center 13 and the piston axis 3b or the cylinder axis 1a, being approximately between 0.02 to 0.08 times the piston diameter D.

Figure 5:
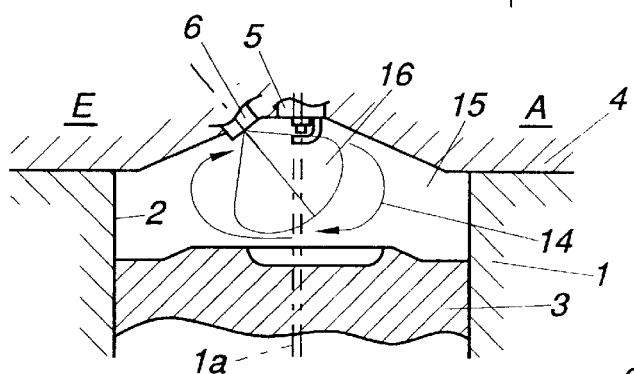
FIG. 5 shows the internal combustion engine in a sectional view during a compression cycle.

In order to achieve a purposeful flow from the orifice 6b of the injection device 6 to the ignition location 5b, the intake manifolds 10 as well as the combustion chamber ceiling 4a and the piston top 3a are provided with a tumble-producing arrangement, as a result of which a cylindrical flow is obtained in the combustion chamber 15 according to the arrows 14 as indicated in FIG. 5. The jet cone of the fuel injected via the injection device 6 is indicated with 16.

Figure 6:
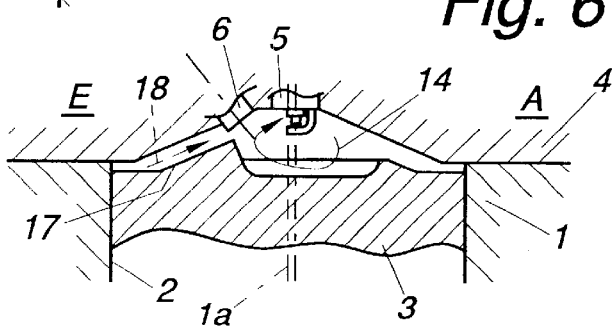
FIG. 6 shows an internal combustion engine in accordance with the invention with a further piston shape in a sectional view in the zone of the upper dead center of the piston.

In order to further support the purposeful flow from the orifice 6b to the ignition location 5b, the piston top 3a may be provided on the side of the injection device 6 with a squeezing surface 17, as a result of which a squeezing flow 18 directed towards the ignition location 5b is obtained in the upper dead center of the piston 3 as shown in FIG. 6.

The jet-guided combustion method performed with the described internal combustion engine leads to the advantage that extreme stratification capabilities can be achieved at a high stratification stability. This enables very low specific fuel consumptions. As a result of the laterally offset injection device 6, coking of the orifice 6b due to higher flow speeds in the orifice zone is effectively prevented. The centrally arranged ignition device 5 allows a favorable flame propagation and thus an even combustion.

What is claimed is:

1. A spark-ignition internal combustion engine with one reciprocating piston per cylinder, with direct injection into the combustion chamber which operates according to a jet-guided combustion method, with at least one injection device and one ignition device per cylinder, wherein the ignition device is disposed centrally in the zone of a cylinder axis, and the injection device is disposed laterally offset in the direct vicinity of a ignition location, with a distance between an orifice of the injection device and the ignition location being 0.1 to 0.24 times the piston diameter.

2. The internal combustion engine according to claim 1, wherein an angle of inclination of a jet axis of the injection device is approx. between 40° and 80° to a cylinder head sealing plane.

3. The internal combustion engine according to claim 1, wherein the angle between the jet axis of the injection device and an axis of the ignition device is approx. between 10° and 65°.

4. The internal combustion engine according to claim 3, wherein the axis of the ignition device is disposed parallel to the cylinder axis.

5. The internal combustion engine according to claim 1, wherein a flat, rounded and substantially circular trough is formed in the piston.

6. The internal combustion engine according to claim 5, wherein the center of the piston trough is, as seen in the a plan view, displaced with respect to the cylinder axis in the direction of the jet axis of the injection device.

7. The internal combustion engine according to claim 5, wherein the piston trough is provided with a piston depth of between approx. 0.04 and 0.1 times the piston diameter.

8. The internal combustion engine according to claim 5, wherein a trough diameter of the piston trough is approx. 0.35 to 0.5 times the piston diameter.

9. The internal combustion engine according to claim 1, wherein a combustion chamber ceiling formed by a cylinder head and/or a piston top are shaped in such a way that during the compression stroke of the piston a purposeful flow is initiated from the injection device to the ignition device at an upper dead center.

10. The internal combustion engine according to claim 9, wherein the piston top is provided on the side of the injection device with a squeezing surface.

11. The internal combustion engine according to claim 5, wherein the center of the piston trough is displaced relative to the cylinder axis in the direction of the jet axis of the injection device between 0.02 and 0.08 times a diameter of the piston.

12. A spark-ignition internal combustion engine with one reicprocating piston per cylinder, the direct injection into the combustion chamber which operates according to a jet-guided combustion method, with at least one injection device and one ignition device per cylinder, wherein the ignition device is disposed centrally in the zone of a cylinder axis, and the injection device is disposed laterally offset in the direct vicinity of a ignition location, with a distance between an orifice of the injection device and the ignition location being 0.1 to 0.24 times the piston diameter, wherein a flat, rounded and substantially circular trough is formed in the piston and wherein the piston trough is provided with a piston depth of between approx. 0.04 and 0.1 times the piston diameter.

* * * * *